United States Patent [19]
Wilson

[11] Patent Number: 6,143,343
[45] Date of Patent: Nov. 7, 2000

[54] PROCESS FOR PRESERVING TASTE AND REDUCING BACTERIA IN FROZEN SEAFOOD PRODUCTS

[76] Inventor: Donald W. Wilson, P.O. Box 489, Apaiachicola, Fla. 32329

[21] Appl. No.: 09/347,660

[22] Filed: Jul. 6, 1999

[51] Int. Cl.⁷ ...................................................... A23L 1/00
[52] U.S. Cl. ................................ 426/524; 62/64; 426/506
[58] Field of Search .................................. 426/524, 506; 62/63, 64, 65

[56] References Cited

U.S. PATENT DOCUMENTS

| | | | |
|---|---|---|---|
| 3,128,606 | 4/1964 | Watson | 62/63 |
| 4,087,265 | 5/1978 | Benson | 62/63 |
| 4,659,574 | 4/1987 | Carlsson et al. | 426/524 |

*Primary Examiner*—George C. Yeung
*Attorney, Agent, or Firm*—John Wiley Horton; Booth & Horton, P.A.

[57] ABSTRACT

A process and device for reducing the harmful affects of bacterial contamination in seafood products via freezing the seafood products and maintaining them in cold storage. The process and device features an ice glazing step in which the raw product is sealed in a thin layer of ice. This layer of ice serves to preserve the raw product's original taste during the cold storage.

4 Claims, 5 Drawing Sheets

PROCESS FOR PRESERVING TASTE AND REDUCING BACTERIA IN FROZEN SEAFOOD PRODUCTS

BACKGROUND—FIELD OF INVENTION

This invention relates to the preservation of taste freshness in frozen seafood products. The invention is especially applicable to those products where freezing is effective to reduce or eliminate the harmful effects of bacterial contamination, such as raw oysters.

DESCRIPTION—DESCRIPTION OF PRIOR ART

The prevention of bacterial contamination has long been a concern in the seafood packaging industry. In recent years, with rising incidents of oyster contamination, this concern has grown more intense. While methods of bacterial decontamination have long been understood, the seafood industry presents complicated additional factors. For example, it is commonly known that boiling the contaminated seafood will kill bacteria. This process greatly alters the taste, however. As the end user is often accustomed to consuming the product in the raw state, this alteration of taste can prove disastrous.

Several prior art inventions have been proposed to purify contaminated oysters without altering the taste. Illustrating the prior art are U.S. Pat. No. 5,628,280 to Ericsson (1997), U.S. Pat. No. 5,482,726 to Robinson, Jr. (1996), U.S. Pat. No. 5,249,548 to Dupuy (1993), U.S. Pat. No. 5,186,121 to Smith, Jr. (1993), U.S. Pat. No. 4,653,429 to Murphy (1987), U.S. Pat. No. 4,537,149 to Ryan (1985), U.S. Pat. No. 3,641,982 to Woodridge (1972), and U.S. Pat. No. 3,418,138 to Dennis (1965). All these devices attempt to purify the oyster by immersing the oyster in circulating purified water. The oysters will naturally pull in the purified water, and subsequently expel the water, along with some of the contaminants contained in the oyster. If the oyster is constantly fed clean water, it will gradually clean itself by this process.

Unfortunately, the oysters must be fed a large volume of water in order for this process to work. The Dupuy invention illustrates this problem. This device uses a very large volume of water to purify at least 30,000 oysters per depuration cycle. The tankage involved is suitable only for a very large producer who is able to make a substantial capital investment. Likewise, the invention described in the Smith patent proposes using underground tanks of several thousand gallons. Most of the devices listed also use seawater which, owing to its salinity, is corrosive.

These prior art systems have been demonstrated to be somewhat effective in the elimination of bacterial contamination. The process employed is slow, however. The Smith device, for example, specifies immersion for 48 hours. In a production environment, this delay is a significant problem. The immersion process cannot be modified by the addition of boiling or freezing, however, because that would change the taste of the finished product. Preservation of the taste of the fresh raw oyster is paramount, and it is this concern which has caused producers to go to the lengths shown in the prior art.

Another approach to bacterial elimination in shellfish has been to freeze the raw product. Freezing for extended periods is know to be effective in the elimination of bacteria such as vibrio vulnificus. This method is illustrated by U.S. Pat. No. 4,087,265 to Benson (1978). The Benson device uses a frozen carbon dioxide cloud to rapidly chill oysters contained in an ice water slurry. Freezing offers the additional advantage of long-term storage and transportation. Unfortunately, as is commonly known, conventional freezing substantially effects the taste of a raw oyster.

The known methods for decontaminating bacterial infection in oysters are therefore limited in that they:

(1) Require large volumes of water;
(2) Require the use of corrosive saltwater;
(3) Are expensive;
(4) Are time consuming; and
(5) Alter the taste of the oyster.

The Applicant has discovered that the harmful effects of bacterial contamination may be virtually eliminated by flash freezing the raw oyster down to a temperature of at least −15 degrees Fahrenheit, and then holding the frozen product between −10 degrees Fahrenheit and 0 degrees Fahrenheit for an additional 14 days. The additional time in cold storage significantly reduces the harmful effect of any remaining bacteria. In the absence of an additional process, however, the oysters undergo an alteration in taste. This phenomenon, sometimes know as "freezer burn", has been a persistent problem.

OBJECTS AND ADVANTAGES

Accordingly, the primary object of the present invention is to use the freezing method to eliminate bacterial contamination, while at the same time preserving the original taste of the oyster. Additional objects of the present invention are as follows:

(1) to eliminate the need for large volumes of water;
(2) to eliminate the use of corrosive saltwater;
(3) to reduce the cost of decontamination; and
(4) to provide a speedy process of decontamination.

These objects and advantages will be fully explained in the details hereafter described, explained, and claimed, with reference being made to the accompanying drawings.

DRAWING FIGURES

Figure 1:
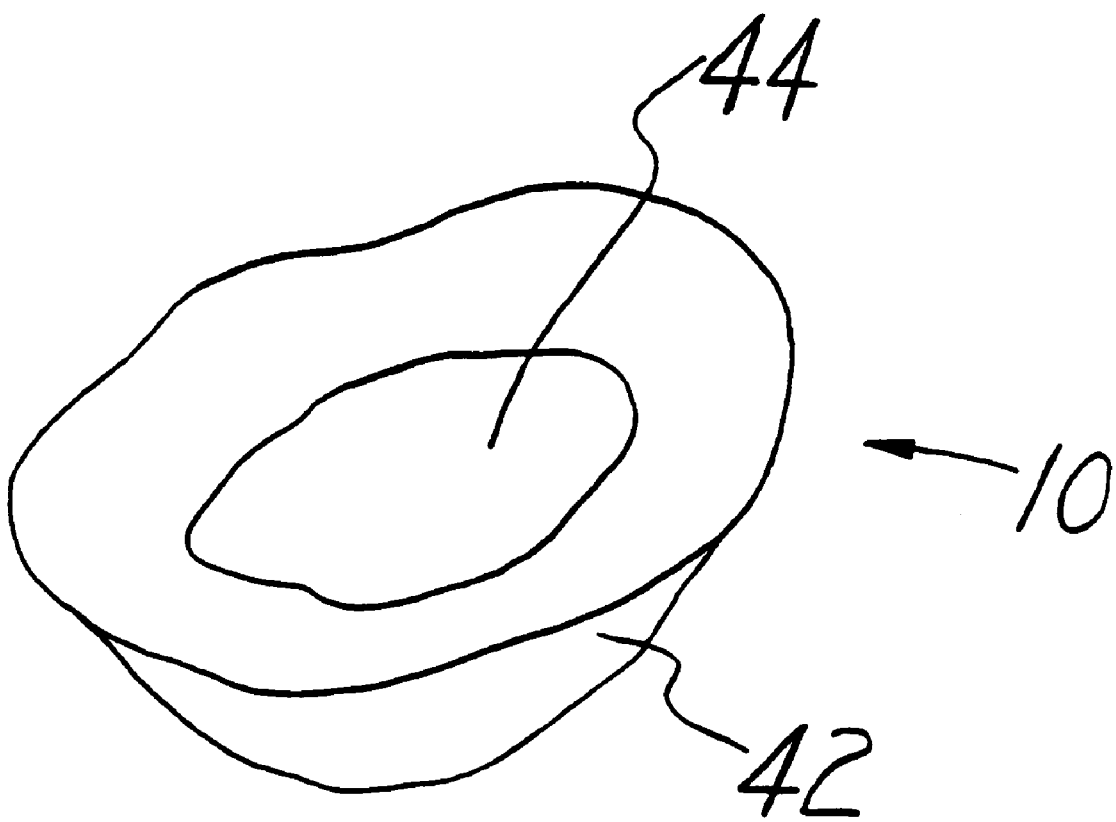
FIG. 1 is an isometric view, showing an oyster in the shucked state.

| Reference Numerals in Drawings | | | |
|---|---|---|---|
| 10 | shucked oyster | 12 | tray |
| 14 | cryo freezing unit | 16 | cryo conveyor belt |
| 18 | cryo housing | 20 | first carbon dioxide jet |
| 22 | second carbon dioxide jet | 24 | third carbon dioxide jet |
| 26 | first agitation fan | 28 | second agitation fan |
| 30 | glazing unit | 32 | first water jet |
| 34 | second water jet | 36 | glazing conveyor belt |
| 38 | loading area | 40 | unloading area |
| 42 | bottom shell | 44 | meat |
| 46 | water manifold | 48 | support bracket |

DESCRIPTION OF THE PREFERRED EMBODIMENT—FIGS. 1 THROUGH 4

The preferred embodiment of the invention will now be explained, beginning with FIG. 1. Oysters are typically delivered to a seafood packaging facility in the same state as when they were harvested from the sea floor. The first step in the operation is to "shuck" the oyster, meaning that the top half of the oyster's shell is removed. FIG. 1 depicts an oyster with its top shell removed. Bottom shell 42 remains. Contained within bottom shell 42 is meat 44. This assembly constitutes shucked oyster 10.

Figure 2:
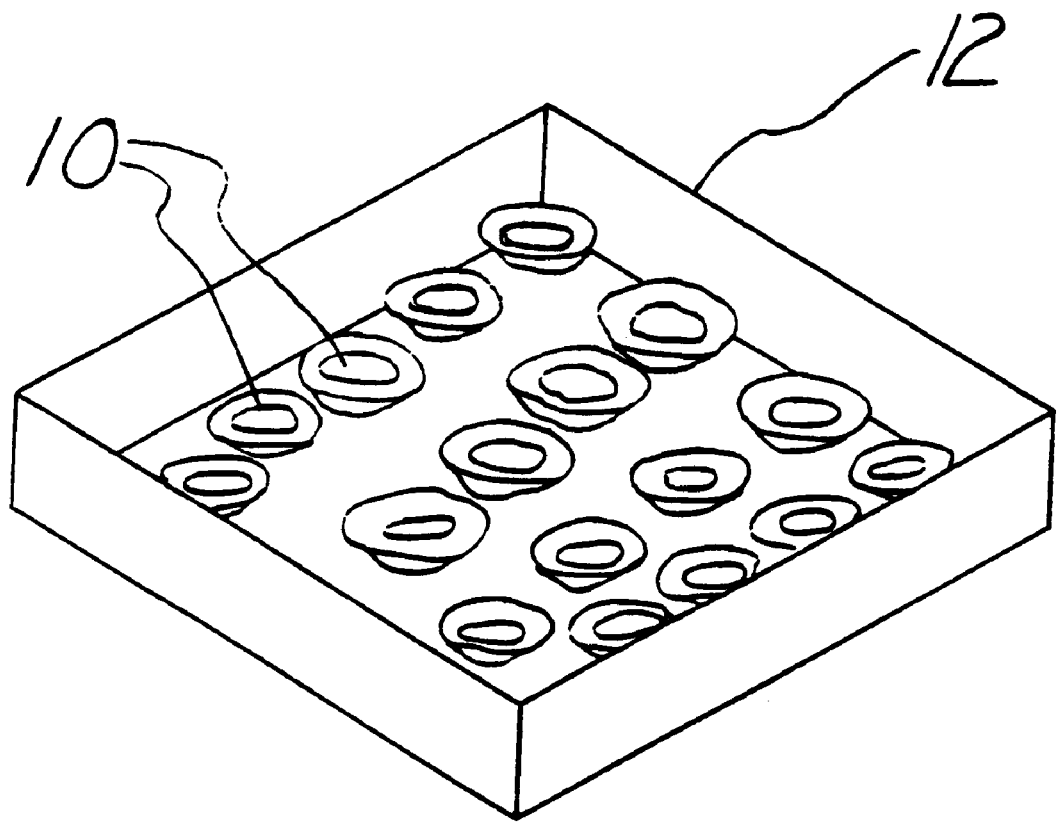
FIG. 2 is an isometric view, showing how shucked oysters may be grouped together on trays for easier handling.

It is possible to manually place a plurality of shucked oysters 10 on a conveyor belt for processing. However, it has been determined that it is advantageous to group the plurality of shucked oysters 10 on a tray 12 to promote easier handling, as illustrated in FIG. 2. Tray 12 may be made of many different materials. In the preferred embodiment, tray 12 is made of wax coated cardboard. The use of cardboard allows the finished oysters to be shipped in tray 12 without undue cost.

Figure 3:
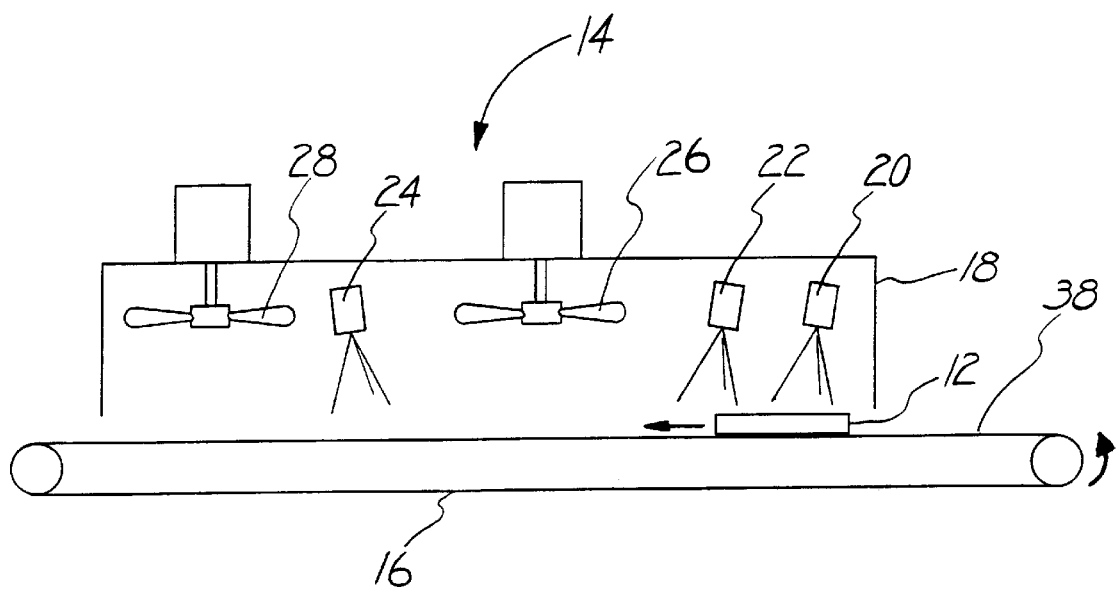
FIG. 3 is a side elevation view, showing the cryo freezing portion of the present invention.

Once shucked oysters 10 have been placed in trays 12, they are ready to begin the freezing process. Turning now to FIG. 3, cryo freezing unit 14 will be explained. Cryo freezing unit 14 has cryo conveyor belt 16, which moves in the direction indicated by the arrows. Trays 12 containing shucked oysters 10 are placed on cryo conveyor belt 16 in loading area 38. Trays 12 are then carried along by cryo conveyor belt 16 in a direction from right to left in the view.

Cryo housing 18 is provided to contain the process as trays 12 proceed through cryo freezing unit 14. The process will be explained in the same order of events as tray 12 experiences as it proceeds along cryo conveyor belt 16. First, tray 12 passes underneath first carbon dioxide jet 20, which blasts tray 12 with a cloud of frozen carbon dioxide. Tray 12 next passes beneath second carbon dioxide jet 22, which also blasts tray 12 with a cloud of frozen carbon dioxide. The effect of this process is to rapidly lower the temperature of shucked oysters 10 within tray 12. First agitation fan 26 is provided to stir the cloud of frozen carbon dioxide in order to ensure that all areas of tray 12 are equally exposed to the cooling effect.

After tray 12 passes beneath first agitation fan 26, it next passes beneath third carbon dioxide jet 24. Third carbon dioxide jet 24 blasts tray 12 with more frozen carbon dioxide, thereby further reducing the temperature of shucked oysters 10 within tray 12. Tray 12 next passes beneath second agitation fan 28, which stirs the cloud of frozen carbon dioxide to ensure uniform distribution over tray 12. The temperature of shucked oysters 10 has by this time been reduced from ambient conditions to −15 degrees Fahrenheit or below. Tray 12 then proceeds out of cryo housing 18.

Figure 4:
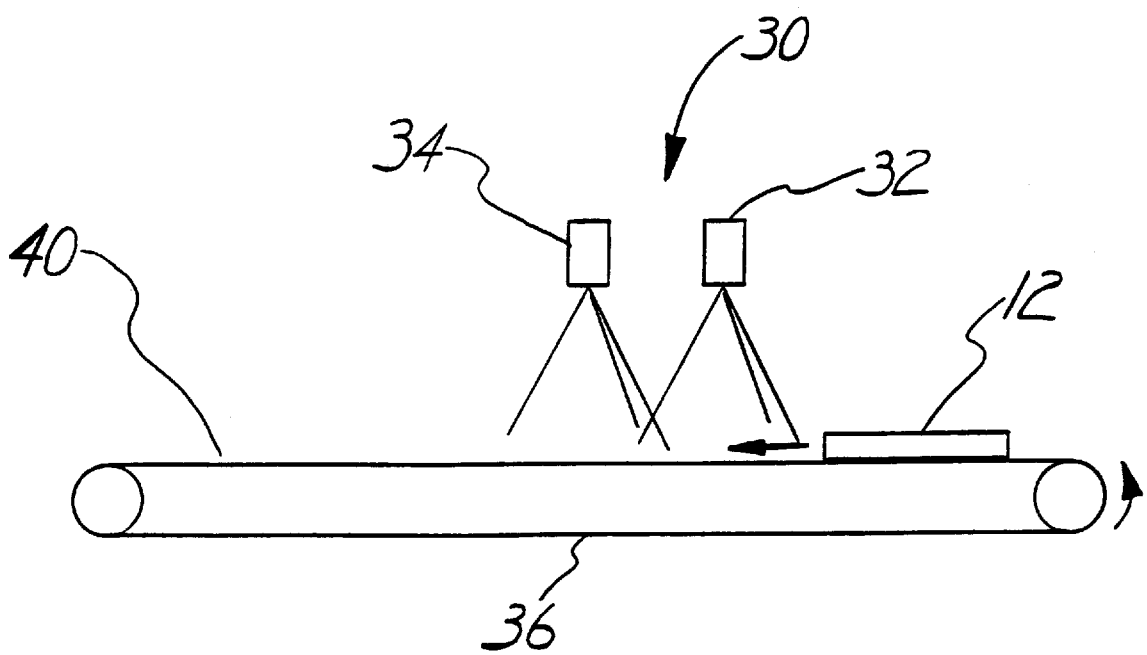
FIG. 4 is a side elevation view, showing the glazing portion of the present invention.

The end of cryo conveyor belt 16, being the left portion as shown in FIG. 3, is placed immediately adjacent to the start of glazing unit 30, which will be described in FIG. 4. The right-hand portion of glazing conveyor belt 36, as it appears in FIG. 4 is placed immediately adjacent to the lefthand portion of cryo conveyor built 16, as shown in FIG. 3. The effect of this proximity is that when tray 12 passes off the end of cryo conveyor belt 16, it passes smoothly onto the beginning of glazing conveyor belt 36. Thus, tray 12 passes smoothly from cryo freezing unit 14 to glazing unit 30.

The reader should be aware that the principle of cryo freezing unit 14 is commonly known in the prior art. This type of device is in use for rapidly freezing many types of frozen food products. However, while the novel aspects of this invention do not lie within cryo freezing unit 14, an explanation of its operation is significant in understanding the remainder of the invention.

At the point where tray 12 exits cryo freezing unit 14, shucked oysters 10 have been flash frozen. Without an additional process, they would be subject to the same taste alteration that attends every conventional freezing process. Glazing unit 30 is provided to account for this concern.

Returning to FIG. 4, tray 12 is transported by glazing conveyor belt 36 in the direction indicated by the arrows. The process carried out within glazing unit 30 will be explained in the same order of events as tray 12 experiences as it proceeds along glazing conveyor belt 36. Tray 12 passes beneath first water jet 32, which sprays tray 12 with a fine mist of water. This fine mist of water forms a very thin glazing on the surface of each shucked oyster 10 within tray 12.

Tray 12 next passes beneath second water jet 34, which sprays tray 12 with another fine mist of water. This second mist of water thickens the glazing on the surface of each shucked oyster 10 within tray 12. Tray 12 then passes on to unloading area 40, where it is removed by hand and placed in containers for storage and shipping.

Figure 5:
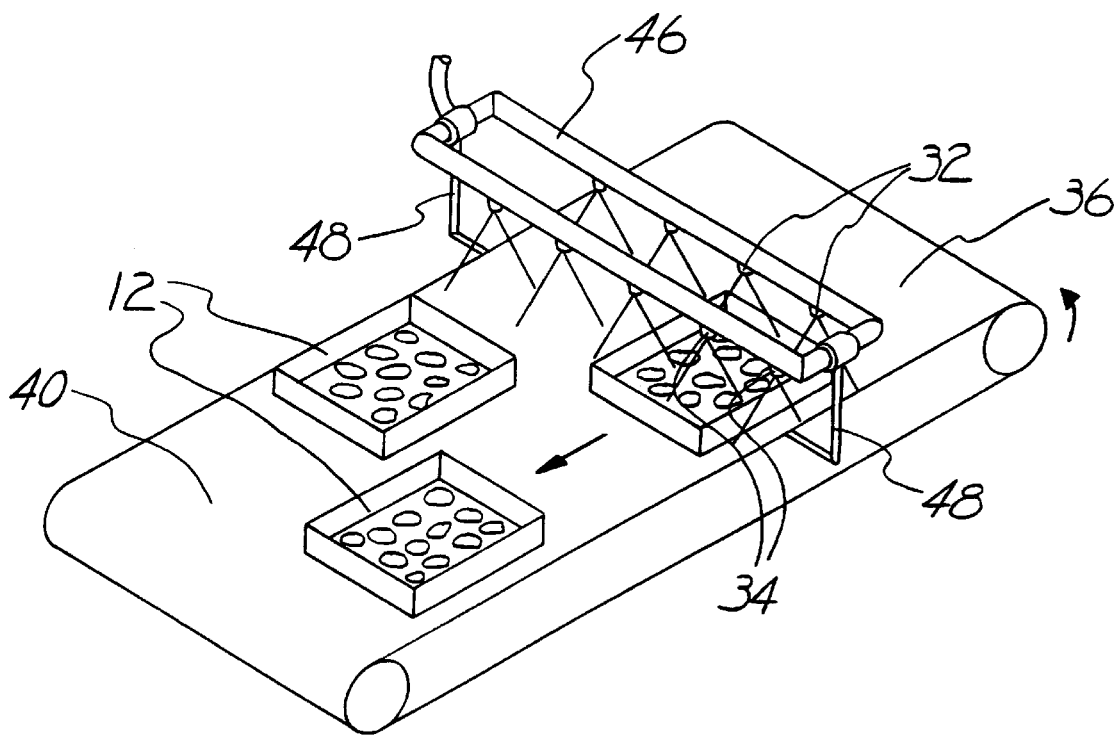
FIG. 5 is an isometric view of the glazing unit.

FIGS. 3 and 4 represent the invention in a simplified, two-dimensional presentation. FIG. 5 is provided to give the reader a better understanding of the novel aspects of the device. First water jet 32 is actually a plurality of first water jets 32 fed by water manifold 46. They extend across the entire width of glazing conveyor belt 36. Second water jet 34 is actually a plurality of second water jets 34. The spacing of the plurality of first water jets 32 and the plurality of second water jets 34 is staggered to ensure complete coverage of water mist across any tray 12 passing beneath water manifold 46. Support brackets 48 are provided to hold water manifold 46 in the correct position above glazing conveyor belt 36.

The reader will appreciate that a large number of trays 12 may be fed through the device in any sort of spacing and orientation. The spacing of the water jets is intended to provide complete water mist coverage for tray 12, no matter what orientation tray 12 is in. The reader should also be aware that first water jets 32 and second water jets 34 do not provide high pressure streams of water. Rather, they provide a finely distributed mist which settles on trays 12 as they pass beneath. This fine mist, upon coming in contact with the very cold surface of shucked oysters 10, forms a thin layer of ice in much the same fashion as freezing fog.

The Applicant has determined that this thin layer of ice formed on the surface of shucked oyster 10 prevents the phenomenon of "freezer burn." Shucked oysters 10, protected by the ice glazing, may be stored for prolonged periods without any alteration in taste. Thus, the anti-bacterial effects of prolonged cold storage may be exploited without any alteration in taste.

The Applicant has determined that placing the glazed shucked oysters 10 in cold storage for a period of at least 10 days, and preferably 14 days, will destroy nearly all harmful bacteria. The temperature in the cold storage is typically maintained between −10 degrees Fahrenheit and 0 degrees Fahrenheit. This same temperature should be maintained during the shipment of the oysters, and subsequent storage at the final destination. The oysters are only removed from cold storage and allowed to thaw just before they are prepared for serving.

The prolonged time in cold storage is critical for achieving the full anti-bacterial effect. The reader may wonder, then, how the proposed invention offers any time savings over the cited prior art depuration methods. The important distinction is in initial processing time, which is the time the seafood product spends in the processing and packing part of a seafood plant. The present invention does not consume much initial processing time. The time consumed is simply in cold storage, which is considerably less expensive than initial processing time.

From the preceding descriptions, a number of advantages of the proposed invention are apparent:

1. It renders bacteria contaminated oysters safe for consumption, without altering the original taste;
2. It eliminates the need for large volumes of water;
3. It eliminates the use of corrosive saltwater;
4. It reduces the cost of decontamination; and
5. It provides a speedy initial process of decontamination.

SUMMARY, RAMIFICATIONS, AND SCOPE

Accordingly, the reader will appreciate that the proposed invention can greatly reduce the harmful effects of bacterial contamination in raw oysters without altering the original taste. Although the preceding description contains significant detail, it should not be construed as limiting the scope of the invention but rather as providing illustrations of the preferred embodiment of the invention. For example, the use of frozen carbon dioxide as the primary cooling means could be changed to other types of refrigeration, the conveyor belts could be modified to better handle individual oysters, etc. These alterations could be made without affecting the novel aspects of the invention. Thus, the scope of the invention should be fixed by the following claims, rather than by the examples given.

Having described my invention, I claim:

1. A process for rendering a contaminated oyster safe for human consumption without altering the original taste, comprising:
   a. removing the top shell of said oyster so as to create a shucked oyster;
   b. rapidly lowering the temperature of said shucked oyster from ambient conditions to less than zero degrees Fahrenheit;
   c. spraying said shucked oyster with a fine mist of water so as to form a thin layer of ice on the surface of said shucked oyster; and
   d. placing said shucked oyster in cold storage at a temperature of no more than zero degrees Fahrenheit for a period of at least ten days.

2. The process as recited in claim 1, further comprising the additional step of maintaining said shucked oyster in cold storage at a temperature of no more than zero degrees Fahrenheit until it reaches its final destination and is ready to be served.

3. A process for rendering contaminated oysters safe for human consumption without altering the original taste, comprising:
   a. removing the top shell from a plurality of said oysters so as to create a plurality of shucked oysters;
   b. placing said plurality of said shucked oysters into a tray so that they can be handled as a unit;
   c. rapidly lowering the temperature of said shucked oysters within said tray from ambient conditions to less than zero degrees Fahrenheit;
   d. spraying said shucked oysters within said tray with a fine mist of water so as to form a thin layer of ice on the surface of said shucked oysters; and
   e. placing said shucked oysters within said tray in cold storage at a temperature of no more than zero degrees Fahrenheit for a period of at least ten days.

4. The process as recited in claim 3, further comprising the additional step of maintaining said shucked oysters within said tray in cold storage at a temperature of no more than zero degrees Fahrenheit until they reach their final destination and are ready to be served.

\* \* \* \* \*